(12) United States Patent
Ramamoorthy et al.

(10) Patent No.: US 8,015,079 B2
(45) Date of Patent: Sep. 6, 2011

(54) PICK RELEASE PERFORMANCE USING A MULTI-THREADED ARCHITECTURE TO DISTRIBUTE THE WORKLOAD ACROSS MULTIPLE PROCESSORS

(75) Inventors: Dinesh Ramamoorthy, Mountain View, CA (US); Anshuman Sharma, Foster City, CA (US)

(73) Assignee: Oracle International Corporation, Redwood Shores, CA (US)

(*) Notice: Subject to any disclaimer, the term of this patent is extended or adjusted under 35 U.S.C. 154(b) by 530 days.

(21) Appl. No.: 12/165,865

(22) Filed: Jul. 1, 2008

(65) Prior Publication Data
US 2009/0173780 A1   Jul. 9, 2009

Related U.S. Application Data

(60) Provisional application No. 61/019,398, filed on Jan. 7, 2008.

(51) Int. Cl.
*G06F 17/00* (2006.01)

(52) U.S. Cl. .............. 705/28; 705/26; 705/7; 705/8; 235/376

(58) Field of Classification Search ............ 705/28, 705/8, 7, 26; 235/376
See application file for complete search history.

(56) References Cited

U.S. PATENT DOCUMENTS

| | | | |
|---|---|---|---|
| 6,594,535 B1* | 7/2003 | Costanza | 700/97 |
| 7,469,219 B2* | 12/2008 | Goldberg | 705/26 |
| 2006/0004627 A1* | 1/2006 | Baluja | 705/14 |
| 2006/0282345 A1* | 12/2006 | Nelson | 705/28 |
| 2008/0015958 A1* | 1/2008 | Vanker et al. | 705/28 |
| 2008/0294536 A1* | 11/2008 | Taylor et al. | 705/28 |
| 2009/0112675 A1* | 4/2009 | Servais | 705/8 |

* cited by examiner

*Primary Examiner* — Vanel Frenel
(74) *Attorney, Agent, or Firm* — Kilpatrick Townsend & Stockton LLP

(57) ABSTRACT

In various embodiments, methods and systems can provide highly efficient order processing suitable for high volume order processing businesses. A batch of orders can be preprocessed to create smaller data sets that group orders for the same item together. The smaller data sets can then be analyzed and processed in parallel without causing database locks. Thus, the time required to complete the order fulfillment cycle may be reduced, which may in turn, increase one or more of operation efficiency, customer satisfaction, sales volume and profits.

18 Claims, 8 Drawing Sheets

| Order Number | Order Line | Item | Quantity | Warehouse (Organization) | Required By Date | Customer |
|---|---|---|---|---|---|---|
| 10000 | 1 | ABC | 10 | San Francisco | 31-JAN-2008 | Walmart |
| 10000 | 2 | PQR | 10 | San Francisco | 31-JAN-2008 | Walmart |
| 10001 | 1 | ABC | 20 | San Francisco | 31-JAN-2008 | Target |
| 10001 | 2 | XYZ | 10 | San Francisco | 31-JAN-2008 | Target |
| 10002 | 1 | MNO | 20 | San Francisco | 31-JAN-2008 | Walmart |
| 10002 | 2 | MNO | 10 | San Francisco | 04-FEB-2008 | Walmart |
| 10003 | 1 | ABC | 30 | San Francisco | 31-JAN-2008 | Walmart |

FIG. 4A

| Delivery Line id | Order Number | Order Line | Item | Quantity | Warehouse (Organization) | Required By Date | Customer |
|---|---|---|---|---|---|---|---|
| 1 | 10000 | 1 | ABC | 10 | San Francisco | 31-JAN-2008 | Walmart |
| 2 | 10000 | 2 | PQR | 10 | San Francisco | 31-JAN-2008 | Walmart |
| 3 | 10001 | 1 | ABC | 20 | San Francisco | 31-JAN-2008 | Target |
| 4 | 10001 | 2 | XYZ | 10 | San Francisco | 31-JAN-2008 | Target |
| 5 | 10002 | 1 | MNO | 20 | San Francisco | 31-JAN-2008 | Walmart |
| 6 | 10002 | 2 | MNO | 10 | San Francisco | 04-FEB-2008 | Walmart |
| 7 | 10003 | 1 | ABC | 30 | San Francisco | 31-JAN-2008 | Walmart |

FIG. 4B

| Batch id | Type | Organization | Item | Line Count | Processed |
|---|---|---|---|---|---|
| 200 | PICK | San Francisco | ABC | 3 | P1 |
| 200 | PICK | San Francisco | MNO | 2 | P2 |
| 200 | PICK | San Francisco | PQR | 1 | P3 |
| 200 | PICK | San Francisco | XYZ | 1 | N |

FIG. 4C

PICK RELEASE PERFORMANCE USING A MULTI-THREADED ARCHITECTURE TO DISTRIBUTE THE WORKLOAD ACROSS MULTIPLE PROCESSORS

CROSS-REFERENCES TO RELATED APPLICATIONS

This application claims the benefit of and priority to U.S. Provisional Patent Application No. 61/019,398, filed Jan. 7, 2008 and entitled "PICK RELEASE PERFORMANCE USING A MULTI-THREADED ARCHITECTURE TO DISTRIBUTE THE WORKLOAD ACROSS MULTIPLE PROCESSORS," the entire disclosure of which is herein incorporated by reference for all purposes.

BACKGROUND OF THE INVENTION

Embodiments of the present invention generally relate to information systems. More particularly, to improving pick release performance using a multi-threaded architecture to distribute workloads across multiple processors.

To operate efficiently and compete effectively in a high volume order business, such as a business that processes thousands, tens of thousand or hundreds of thousands of orders on a daily basis, a company must plan and tightly control the acquisition of the materials and resources that it needs to produce and distribute its products or services. Operations of this scale consume a lot of labor and equipment to store, retrieve and move the necessary materials and components required to fulfill the orders. Planning, replenishing, consuming and shipping inventory in an optimal manner can save millions of dollars by reducing obsolescence and increasing the inventory turns.

A variety of tools exist that provide support in establishing an efficient and responsive order fulfillment cycle. An example of one such tool is Oracle's E-Business Suite which enables a company's entire supply chain including customers, suppliers, manufacturing facilities, warehouses, distributors, carriers, and other trading partners to be linked through a common computer network such as the Internet. Order fulfillment software tools, such as Oracle's E-Business Suite, have become an essential component of high volume processing businesses.

As an illustrative example, a high volume order processing system can be used to control the packing and shipping of thousands of items that can be ordered from any one of several sources such as via a website, a mail catalog and/or through retail stores. Some orders that are processed will be for single products while others will be for multiple products. Obtaining the various products to fulfill orders and scheduling the various resources (e.g., fork lift time, packaging materials, warehouse worker time, etc.) needed to fulfill the orders is necessary prior to making shipments. The order fulfillment process includes many different variables and often requires a significant amount of computer processing power. Orders are often processed sequentially in a batch process to prevent scenarios where, due to resource contention issues, the same item or resource in the same warehouse is requested simultaneously by multiple orders leading to deadlocks in the database.

Because of the importance of the order fulfillment tools and optimal management of order processing to the efficient operation of a facility, improvements in the order processing and fulfillment process are continuously sought.

Accordingly, what is desired is to solve problems relating to order processing and fulfillment process, some of which may be discussed herein. Additionally, what is desired is to reduce drawbacks related to order processing and fulfillment process, some of which may be discussed herein.

BRIEF SUMMARY OF THE INVENTION

In various embodiments, methods and systems can provide highly efficient order processing suitable for high volume order processing businesses. A batch of orders can be preprocessed to create smaller data sets that group orders for the same item together. The smaller data sets can then be analyzed and processed in parallel without causing database locks. Thus, the time required to complete the order fulfillment cycle may be reduced, which may in turn, increase one or more of operation efficiency, customer satisfaction, sales volume and profits.

A further understanding of the nature, advantages, and improvements offered by those inventions disclosed herein may be realized by reference to remaining portions of this disclosure and any accompanying drawings.

BRIEF DESCRIPTION OF THE DRAWINGS

In order to better describe and illustrate embodiments and/or examples of those inventions disclosed herein, reference may be made to one or more accompanying drawings. The additional details or examples used to describe the accompanying drawings should not be considered as limitations to the scope of any of the disclosed inventions, the presently described embodiments and/or examples, and the presently understood best mode of these inventions.

FIG. 4A is an illustrative example of an abbreviated order list;

FIG. 4B is an illustrative example of a delivery line table generated by an embodiment of the present invention from the order list set forth in FIG. 4A;

FIG. 4C is an illustrative example of a work table generated by an embodiment of the present invention during pre-processing from the order list set forth in FIG. 4A;

DETAILED DESCRIPTION OF THE INVENTION

Figure 1:
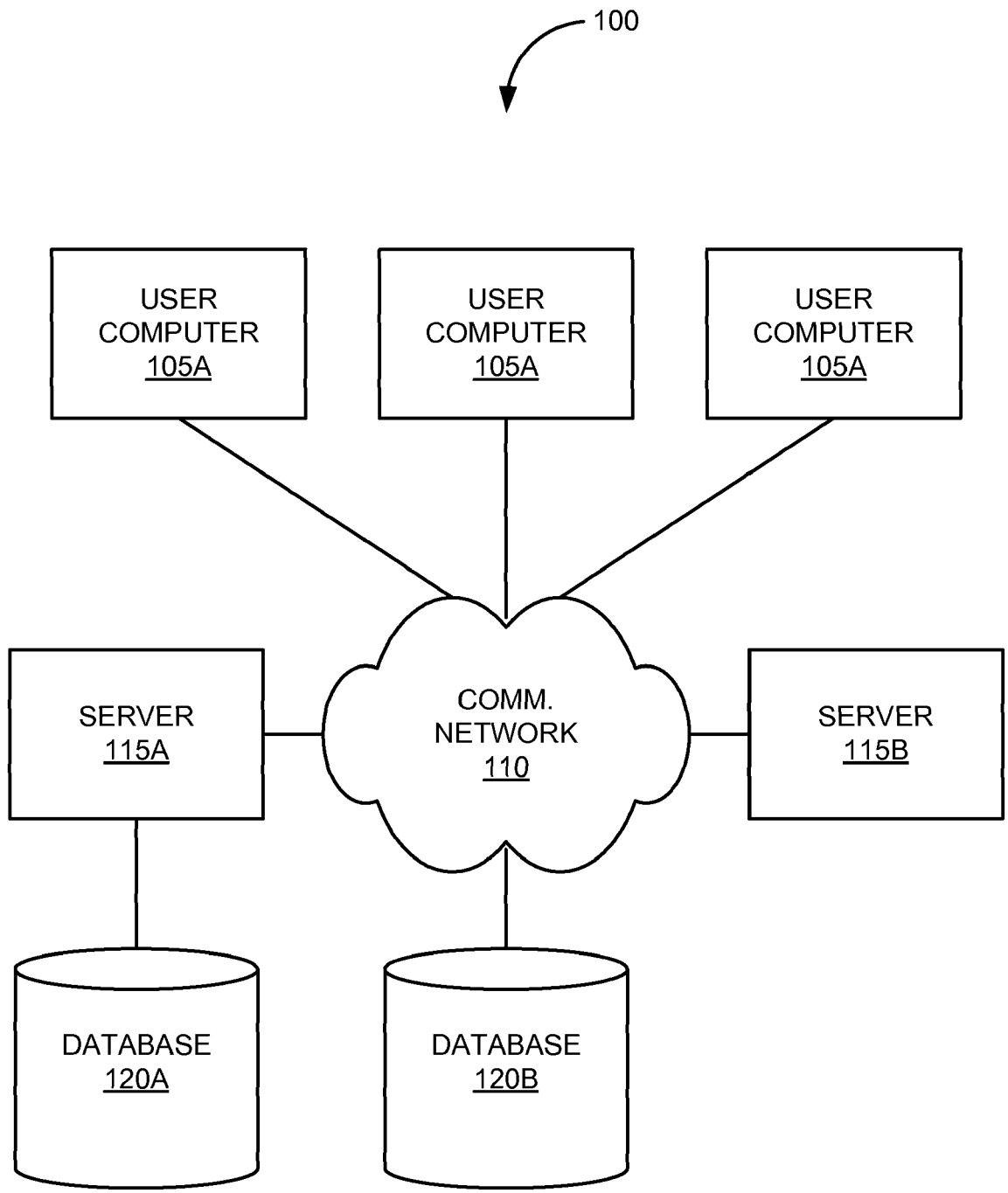
FIG. 1 is a simplified illustration of a system that may incorporate an embodiment of the present invention.

FIG. 1 is a simplified illustration of system 100 that may incorporate an embodiment of the present invention. FIG. 1 is merely illustrative of an embodiment incorporating the present invention and does not limit the scope of the invention as recited in the claims. One of ordinary skill in the art would recognize other variations, modifications, and alternatives.

In one embodiment, system 100 includes one or more user computers 105 (e.g., computers 105A, 105B, and 105C).

User computers 105 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 105 can also have any of a variety of applications, including one or more applications configured to perform methods of the invention, as well as one or more office applications, database client and/or server applications, and web browser applications.

Alternatively, user computers 105 can be any other electronic device, such as a thin-client computer, Internet-enabled mobile telephone, and/or personal digital assistant, capable of communicating via a network (e.g., communications network 110 described below) and/or displaying and navigating web pages or other types of electronic documents. Although the exemplary system 100 is shown with three user computers, any number of user computers or devices can be supported.

Certain embodiments of the invention operate in a networked environment, which can include communications network 110. Communications network 110 can be any type of network familiar to those skilled in the art that can support data communications using any of a variety of commercially-available protocols, including without limitation TCP/IP, SNA, IPX, AppleTalk, and the like. Merely by way of example, communications network 110 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 115 (e.g., computers 115A and 115B). Each of server computers 115 may be configured with an operating system including without limitation any of those discussed above, as well as any commercially-available server operating systems. Each of server computers 115 may also be running one or more applications, which can be configured to provide services to one or more clients (e.g., user computers 105) and/or other servers (e.g., server computers 115).

Merely by way of example, one of server computers 115 may be a web server, which can be used, merely by way of example, to process requests for web pages or other electronic documents from user computers 105. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 105 to perform methods of the invention.

Server computers 115, in some embodiments, might include one ore more file and or/application servers, which can include one or more applications accessible by a client running on one or more of user computers 105 and/or other server computers 115. Merely by way of example, one or more of server computers 115 can be one or more general purpose computers capable of executing programs or scripts in response to user computers 105 and/or other server computers 115, including without limitation web applications (which might, in some cases, be configured to perform methods of the invention).

Merely by way of example, a web application can be implemented as one or more scripts or programs written in any programming language, such as Java™, C, C# or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from database clients running on one of user computers 105 and/or another of server computer 115.

In some embodiments, an application server can create web pages dynamically for displaying the information in accordance with embodiments of the invention. Data provided by an application server may be formatted as web pages (comprising HTML, XML, Javascript, AJAX, etc., for example) and/or may be forwarded to one of user computers 105 via a web server (as described above, for example). Similarly, a web server might receive web page requests and/or input data from one of user computers 105 and/or forward the web page requests and/or input data to an application server.

In accordance with further embodiments, one or more of server computers 115 can function as a file server and/or can include one or more of the files necessary to implement methods of the invention incorporated by an application running on one of user computers 105 and/or another of servers 115. Alternatively, as those skilled in the art will appreciate, a file server can include all necessary files, allowing such an application to be invoked remotely by one or more of user computers 105 and/or server computers 115. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 100 can include one or more databases 120 (e.g., databases 120A and 120B). The location of the database(s) 120 is discretionary: merely by way of example, database 120A might reside on a storage medium local to (and/or resident in) server computer 115A (and/or one or more of user computers 105). Alternatively, database 120B can be remote from any or all of user computers 105 and server computers 115, so long as it can be in communication (e.g., via communications network 110) with one or more of these. In a particular set of embodiments, databases 120 can reside in a storage-area network ("SAN") familiar to those skilled in the art. (Likewise, any necessary files for performing the functions attributed to user computers 105 and server computers 115 can be stored locally on the respective computer and/or remotely, as appropriate). In one set of embodiments, one or more of databases 120 can be a relational database, such as an Oracle™ database, that is adapted to store, update, and retrieve data in response to SQL-formatted commands. Databases 120 might be controlled and/or maintained by a database server, as described above, for example.

Figure 2:
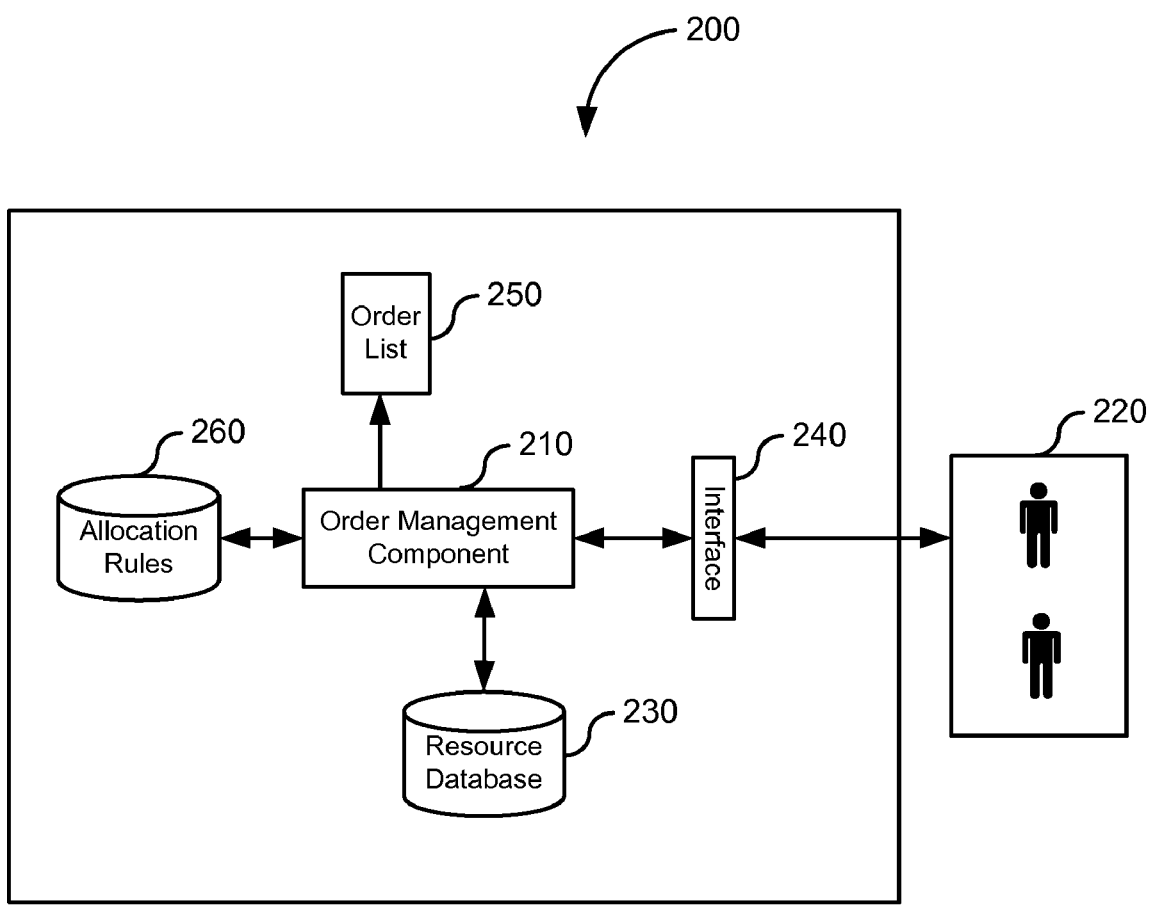
FIG. 2 is a block diagram of a system for improved pick release performance in one embodiment according to the present invention.

FIG. 2 is a block diagram of order fulfillment system 200 for improved pick release performance in one embodiment according to the present invention. Order fulfillment system 200 may be capable of processing thousands, tens of thousands or hundreds of thousands of orders on a daily basis and allows for planning and controlling the acquisition of materials and resources necessary to complete the processing and shipping of such orders or services. In this example, system 200 can include order management component 210. Order management component 210 can include hardware and/or software elements configured to receive, process, and respond to orders received from customers (e.g., customers 220), such as requests to purchase one or more products.

Responses to requests from customers 220 can typically be in the form of fulfilling the requested order. For example, if the order is a request for shipment of a widget X, fulfillment of the order may be the delivering of the widget X to the destination associated with the order. As another example, if the order is a request to book a flight from San Francisco, Calif. to Dallas, Tex., fulfillment of the order may be reserving a seat on a particular flight scheduled for a particular departure date and time.

In processing orders, order management component 210 may reserve available inventory and/or resources necessary to complete the order. In various embodiments, inventory and the other necessary resources to fulfill orders may be stored in database 230. Requests from customer 220 can be made with a client system (not shown) that accesses order management component 210 through interface 240. The client system may be, for example, a personal computer.

Interface 240 can include hardware and/or software elements. In some embodiments, interface 240 may include a set of web pages (and accompanying hardware for hosting and/or serving web pages) that present information to the client system necessary to order products/services from system 200. The web pages may accept input from the customer related to requests for one or more products. The web pages may translate the requests into a format that can be acted upon by order management component 210.

In various embodiments, order management component 210 can process orders in real time or batch mode. When operating in batch mode, order management component 210 can accumulate a large number of orders received over time, for example, into order list 250, that can then be processed at a later time as a batch order. Alternatively, a batch of orders in the form of an order list or other form that can be processed to create order list 250 can be sent to order management component 210 from a customer or other component of system 200. Order list 250 can be stored as a table in a database, as an XML list or in any other appropriate form or data structure that can be processed by order management component 210.

In some embodiments, order management component 210 may make decisions related to fulfilling orders based on a set of pre-defined allocation rules. For example, allocation rules 260 can be created by an organization to define how its supply of products or services (and planned supply of products or services) is allocated to fulfill customer requests in accordance with the organization's business goals. For example, allocation rules 260 can be developed to allocate and reserve percentages of products to preferred customers, allocate and reserve a percentage of products to new customers, and the like.

In further embodiments, order fulfillment system 200 can include lock controls to ensure that the same inventory is not allocated to multiple orders. In previously known order fulfillment systems, orders in order list 250 may have been processed against database 230 in sequential order in order to ensure that resource contention issues did not result in deadlocks in the database. Because of the high volume of orders that need to be processed, such sequential processing of large lists of orders may take considerable time thus delaying the order processing and fulfillment process. Accordingly, in various embodiments, system 200 can provide for parallel order processing with little or not contention among the resources in database 230.

Figure 3A:
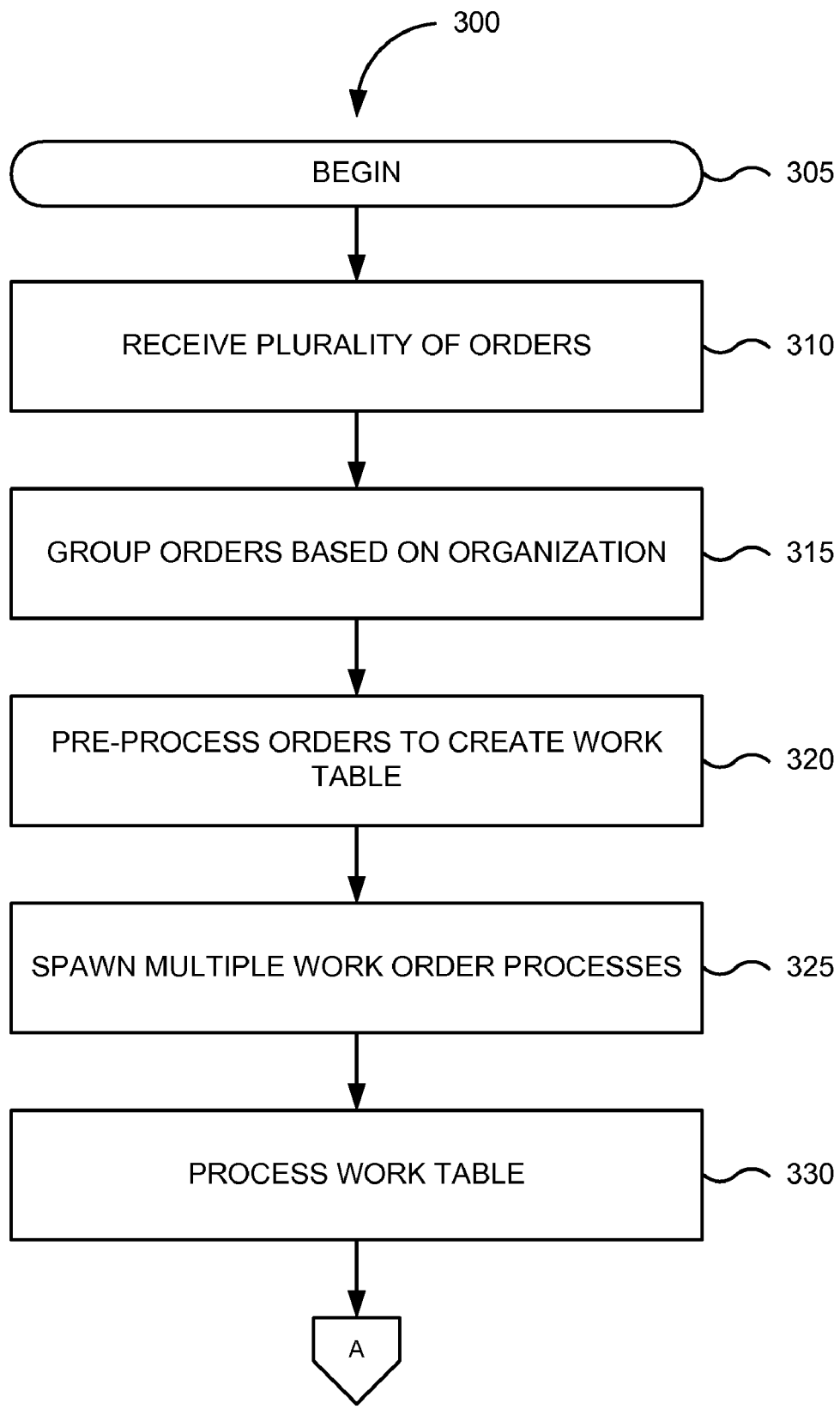
FIGS. 3A and 3B are a flowchart of a method for fulfilling an order in one embodiment according to the present invention.
Figure 3B:
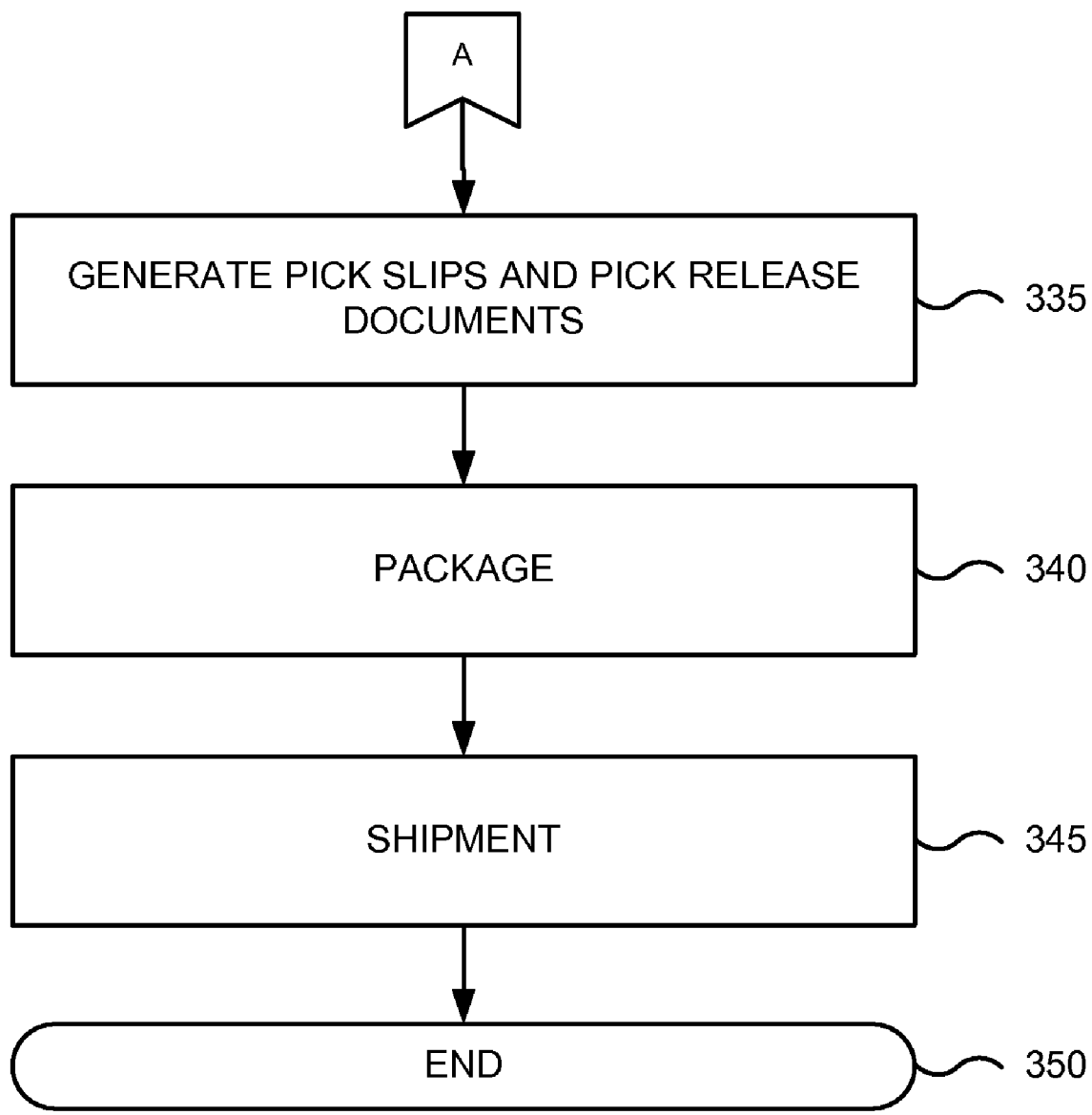

FIGS. 3A and 3B are a flowchart of method 300 for fulfilling an order in one embodiment according to the present invention. The processing depicted in FIGS. 3A and 3B may be performed by software modules (e.g., instructions or code) executed by a processor of a computer system, by hardware modules of an electronic device, or combinations thereof. FIG. 3A begins in step 305.

As shown in FIG. 3A, method 300 starts with the submission or release of a set of orders such as order list. In step 310, a plurality of orders is received. In step 315, orders are grouped by organization. For example, if the orders include orders to be filled by different organizations (e.g., at different warehouses or different manufacturing facilities), order management component 210 of FIG. 2 may group the orders by organization. For each organization, steps 320 to 345 can then performed as discussed below.

In step 320, orders for an organization are pre-processed to organize the orders based on the items/resources that are required to fulfill the orders. Pre-processing the orders can create a new table that groups all orders associated with a particular item/resource together. In order to better illustrate an example of pre-processing step 320 according to the present invention, reference may be made to FIGS. 4A-4C. FIG. 4A is an example of a simplified order list 410 that includes four different orders 10000, 10001, 10002 and 10003 for various products and resources tracked in database 230 of FIG. 2.

Order list 410 can be represented as a database table that includes seven different columns including columns 420A-420G representing order number (420A), order lines (420B), item ordered (420C), quantity (420D), organization (420E), for example a particular warehouse or facility, required by date (720F) and customer (420G). A person of skill in the art will appreciate that order list 410 is for exemplary purposes only and actual order lists may contain additional and/or different columns and attributes.

As evident from FIG. 4A, several of the orders in order list 410 may request the same item and/or resource. For example, order 10000 may requests 10 of item ABC while order 10001 requests 20 of item ABC and order 10003 requests 30 of item ABC. Thus, if order list 410 is processed in parallel without the benefit of pre-processing step 320, the later orders 10001 and 10003 cannot be fulfilled until order 10000 was fulfilled. That is, while the system was working on fulfilling order 10000, item ABC would be locked and could not be reserved by other orders until the fulfillment of order 10000 was completed.

In various embodiments, system 200 can preprocess order list 410 to generate a work table, such as exemplary work table 440 shown in FIG. 4C. Work table 440 can include rows that group orders based on the organizations and items required to fulfill the orders. As shown in FIG. 4A, input list 410 can include three separate order lines for item ABC from the organization "San Francisco." These three separate orders may be accumulated together in work table 440 as a single row 460A for which the value "3" is inserted into column 450E (line count) indicating that there are three separate order lines for item ABC for San Francisco. Similarly, row 460B may indicate that there are 2 separate order lines for item MNO for San Francisco, while rows 460C and 460D may indicate that there is a single order for each of items PQR and XYZ, respectively. Work table 440 may also include a column 450B that indicates the type of action (e.g., "pick" or "pack and ship") associated with each entry in the table.

Referring back to FIG. 3A, in step 325 multiple threads or processes are spawned to process work table 440 of FIG. 3C. The number of processes that can be spawned will depend on the hardware resources available to system 200, and may also be limited by software constraints. In step 330, the work table is processed. If, for example, three processes P1, P2 and P3 were spawned in step 325 to process table 440 during step 330, process P1 can be set to process the orders lines for ABC/San Francisco while process P2 can be set to process the order lines for MNO/San Francisco and process P3 can be set to process the order lines for XYZ/San Francisco. P1, P2 and P3 can all safely operate in parallel because there will be no resource contention issues as each process is focused on fulfilling order lines associated with items distinct from the other processes. Which ever process finishes processing its associated order lines first, can then pick up and process the order line for XYZ/San Francisco identified in row 460D.

In some embodiments, an individual process such as process P1 may use the information that uniquely identifies the row that the process is working on to select order lines from a delivery line table, such as table 420 shown in FIG. 4B. Delivery line table 420 may be similar to input order table 410 except that it includes a unique identifier "Delivery Line ID" (shown as column 430A) for every entry in the table. In the example under discussion, columns 450C and 450D of table 440 may combine to uniquely identify row 460A in table 440. Thus, process P1 may use the information in columns 450C and 450D as a filter on table 430 of FIG. 4B to identify the Delivery Line IDs (DLIDs) that P1 will process during step 330.

In this example, since P1 may be processing item ABC/San Francisco, it can identify DLIDs 1, 3 and 7 in table 430 of FIG. 4B to process during step 330. Similarly, P2 may identify DLIDs 5 and 6 while P3 will identify DLID 2. If P3 finishes processing DLID 2 prior to P1 completing processing DLIDs 1, 3 and 7 and prior to P2 completing processing of DLID 5 and 6, P3 will then process DLID 4. Column 450F of table 440 can be used to track whether or not an entry in worker table 440 has been processed or is currently being processed and by which process. Thus, at the time the snapshot of FIG. 4C was taken P1 was processing the order lines associated with row 460A, P2 was processing the order lines associated with 460B, P3 was processing the order lines associated with 460C and the order lines associated with row 460D were waiting to be processed by the next available thread.

Processing an order in step 330 of FIG. 3 may include populating records in the data tables representing the order to reflect the status of the fulfillment process. Processing may be done according to allocation rules 260 defined by a business to achieve its business goals during the order fulfillment process.

In many environments, picking is driven by a pick slip, which is essentially a printed document that provides line item details of everything that will be grouped together in a single order to be shipped. The pick slip can be used, for example, by a picker in the warehouse to collect all items included in the shipment. Thus, referring to FIG. 3B, as processes complete the processing of the various entries in worker table 440, in step 335, pick slips and/or pick release documents may be generated. In step 340, items can be packaged and, in step 345, items may be shipped to complete the order fulfillment process. FIG. 3 ends in step 350.

In some embodiments, packaging and shipping in steps 340 and 345 can process deliveries sequentially. In other embodiments, packaging and shipping in steps 340 and 345 can instead be performed by spawning multiple processes to handle the processing tasks associated with these portions of the order fulfillment process.

Figure 5:
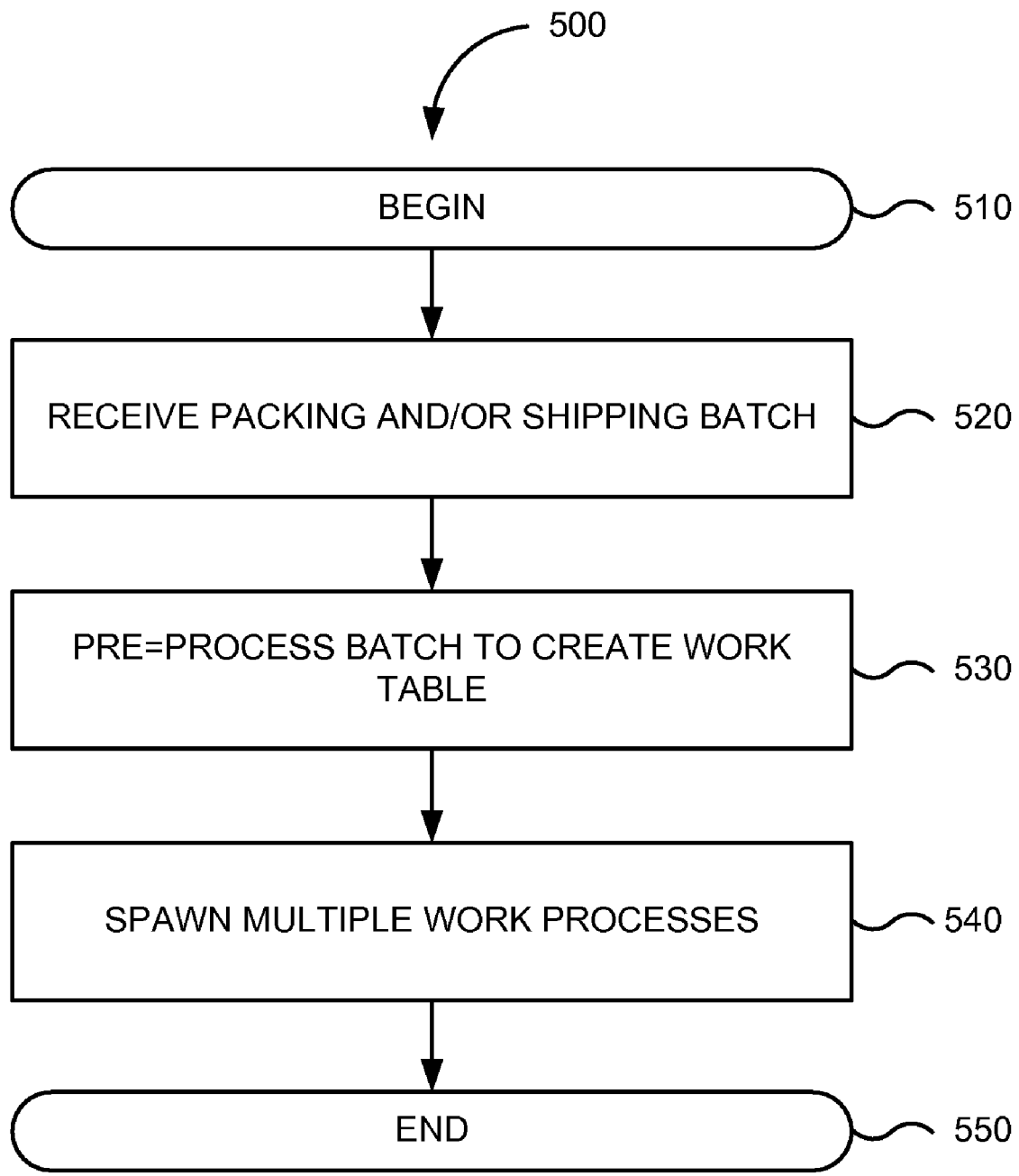
FIG. 5 is a flowchart of a method associated with packing and shipping in one embodiment according to the present invention.

FIG. 5 is a flowchart of a method for packaging and shipping in one embodiment. FIG. 5 begins in step 510. As shown in FIG. 5, in step 520, packaging and/or shipments batches may be received. The batches may be created from a batch of pack and ship orders.

In step 530, the batches are pre-processed to create a work table. In various embodiments, records can be added to work table 440 of FIG. 4C to represent each individual delivery. To better illustrate the creation of delivery records, reference is made to FIGS. 6A and 6B that show different views of exemplary delivery line table 610 and exemplary work table 630, respectively.

Figure 6A:
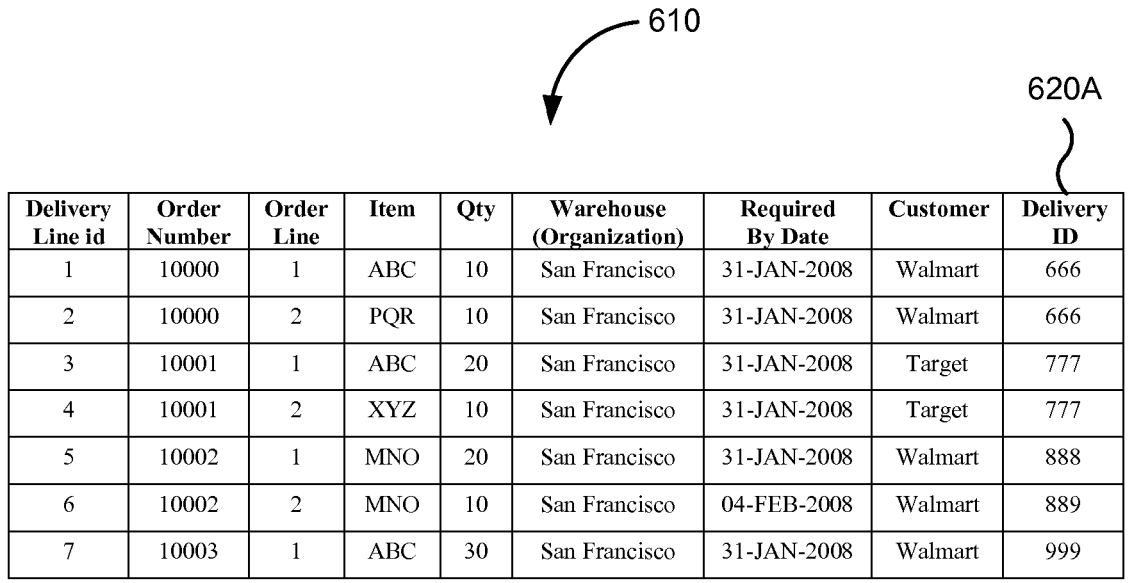
FIG. 6A is another illustrative example of a delivery line table generated by an embodiment of the present invention.
Figure 6B:
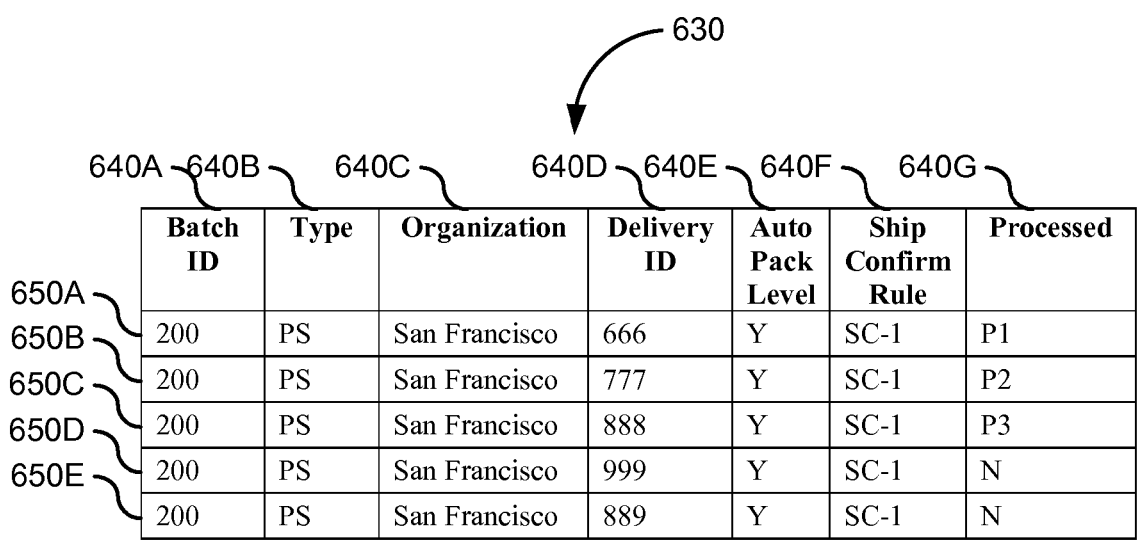
FIG. 6B is another illustrative example of a work table generated by an embodiment of the present invention.

In FIG. 6A, delivery line table 610 may include an additional column 620A to track a delivery identification number for each order line. Each separate and distinct delivery may include its own unique delivery ID number. In FIG. 6A, five separate deliveries are shown: deliveries 666, 777, 888, 889 and 999. Items from each delivery may be packed and shipped together. The delivery ID can be generated by order management component 210 of FIG. 2 either before, during or after the pick release process. FIG. 6B shows five additional records added to work 630, each of which may correspond to one of the five separate delivery IDs listed in table 610.

Returning to FIG. 5, in step 540, multiple processes/threads can then be spawned to process the entries in work table 630. Thus, if three processes P1, P2 and P3 are spawned, P1 can process delivery ID 666 (row 650A) while P2 processes ID 777 (row 650B) and P3 processes ID 888 (row 650C). The first process that finishes can then process delivery ID 889 (row 650D) and the next process that finishes can process delivery ID 999 (row 650E). In this manner pack and ship can be performed much faster than if each delivery was processed sequentially. FIG. 5 ends in step 550.

Figure 7:
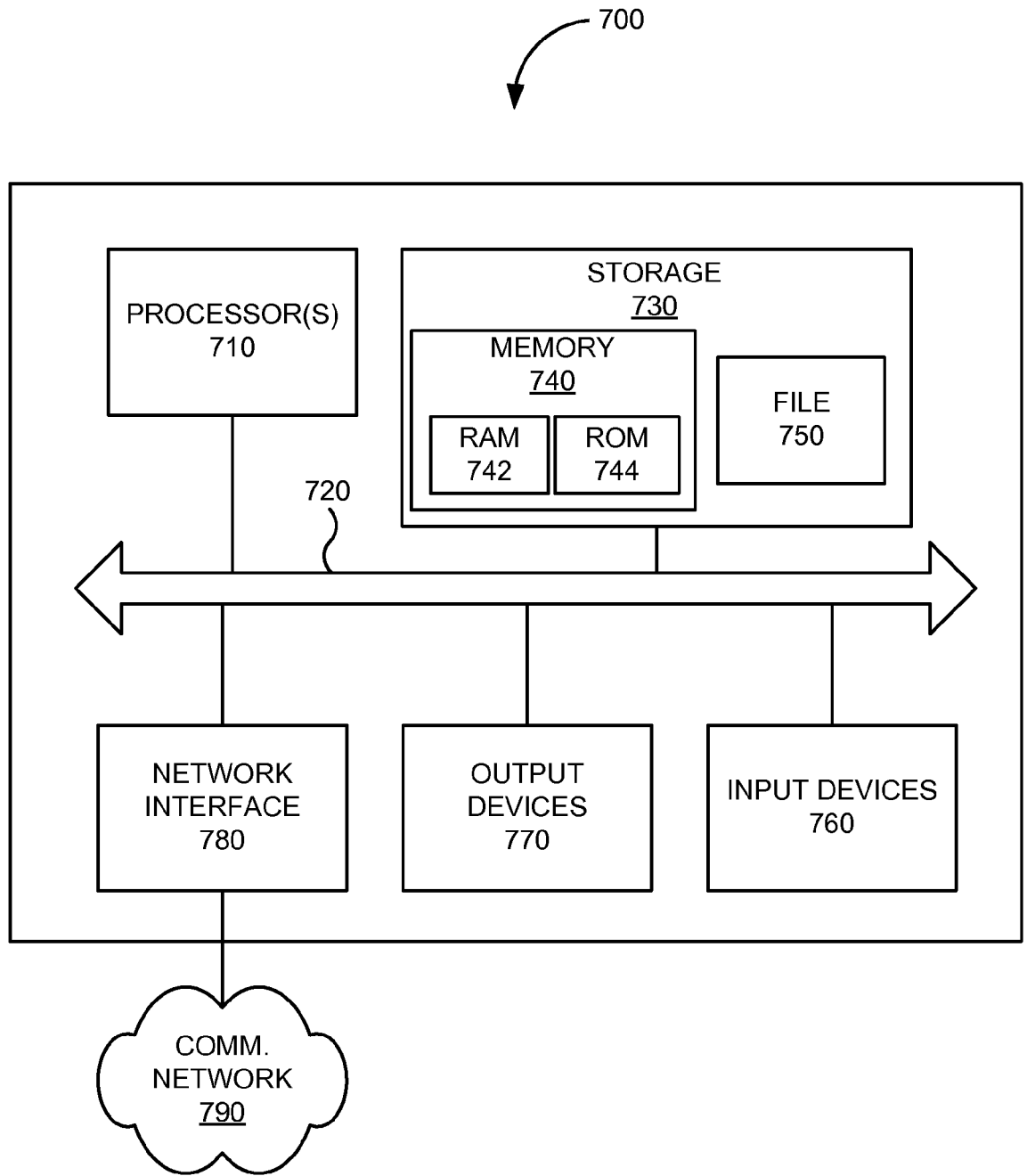
FIG. 7 is a simplified block diagram of a computer system that may be used to practice embodiments of the present invention.

FIG. 7 is a simplified block diagram of computer system 700 that may be used to practice embodiments of the present invention. As shown in FIG. 7, computer system 700 includes processor 710 that communicates with a number of peripheral devices via bus subsystem 720. These peripheral devices may include storage subsystem 730, comprising memory subsystem 740 and file storage subsystem 750, input devices 760, output devices 770, and network interface subsystem 780.

Bus subsystem 720 provides a mechanism for letting the various components and subsystems of computer system 700 communicate with each other as intended. Although bus subsystem 720 is shown schematically as a single bus, alternative embodiments of the bus subsystem may utilize multiple busses.

Storage subsystem 730 may be configured to store the basic programming and data constructs that provide the functionality of the present invention. Software (code modules or instructions) that provides the functionality of the present invention may be stored in storage subsystem 730. These software modules or instructions may be executed by processor(s) 710. Storage subsystem 730 may also provide a repository for storing data used in accordance with the present invention. Storage subsystem 730 may comprise memory subsystem 740 and file/disk storage subsystem 750.

Memory subsystem 740 may include a number of memories including a main random access memory (RAM) 742 for storage of instructions and data during program execution and a read only memory (ROM) 744 in which fixed instructions are stored. File storage subsystem 750 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Input devices 760 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 700.

Output devices 770 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 700.

Network interface subsystem 780 provides an interface to other computer systems, devices, and networks, such as communications network 790. Network interface subsystem 780 serves as an interface for receiving data from and transmitting data to other systems from computer system 700. Some examples of communications network 790 are private networks, public networks, leased lines, the Internet, Ethernet networks, token ring networks, fiber optic networks, and the like.

Computer system 700 can be of various types including a personal computer, a portable computer, a workstation, a network computer, a mainframe, a kiosk, or any other data processing system. Due to the ever-changing nature of computers and networks, the description of computer system 700 depicted in FIG. 7 is intended only as a specific example for purposes of illustrating the preferred embodiment of the computer system. Many other configurations having more or fewer components than the system depicted in FIG. 7 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method for managing order fulfillment in an inventory system, the method comprising:
 receiving, at one or more computer systems associated with the inventory system, information indicative of a plurality of orders, each order in the plurality of orders specifying one or more order line items;
 grouping, with one or more processors associated with one or more computer systems, order line items that are identical across orders in the plurality of orders into a set of one or more order line item groups that reduce the likelihood that reservation of one line item in a first order in the plurality of orders delays reservation in the inventory system of an identical line item in a second order in the plurality of orders;
 assigning, with the one or more processors associated with one or more computer systems, a plurality of reservation processes associated with the inventory system to concurrently process reservations in the inventory system for a plurality of groups in the set of one or more order line item groups; and
 concurrently processing the plurality of groups with multiple processors associated with the one or more computer systems.

2. The method of claim 1 further comprising:
 generating a work table in a database associated with the one or more computer systems for the plurality of reservation processes based on the set of one or more order line item groups, the work table having rows that group order line items based on predetermined criteria.

3. The method of claim 2 further comprising:
 determining a group assignment for a reservation process in the plurality of reservation processes based on the work table.

4. The method of claim 2 further comprising:
 marking a group as processed in the work table.

5. The method of claim 1 further comprising:
 determining a set of packaging rules based on the set of groupings.

6. The method of claim 1 further comprising:
 determining a set of shipping rules based on the set of groupings.

7. A non-transitory computer readable medium storing a set of code modules which when executed by a processor in a plurality of processors of a computer system become operational with the processor for managing order fulfillment in an inventory system, the non-transitory computer readable medium comprising:
 code for receiving information indicative of a plurality of orders, each order in the plurality of orders specifying one or more order line items;
 code for grouping order line items that are identical across orders in the plurality of orders into a set of one or more order line item groups that reduce the likelihood that reservation of one line item in a first order in the plurality of orders delays reservation in the inventory system of an identical line item in a second order in the plurality of orders;
 code for assigning a plurality of reservation processes associated with the inventory system to concurrently process reservations in the inventory system for a plurality of groups in the set of one or more order line item groups; and
 code for initiating concurrent processing of the plurality of groups.

8. The non-transitory computer readable medium of claim 7 further comprising:
 code for generating a work table in a database for the plurality of reservation processes based on the set of one or more order line item groups, the work table having rows that group order line items based on predetermined criteria.

9. The non-transitory computer readable medium of claim 8 further comprising:
   code for determining a group assignment for a reservation process in the plurality of reservation processes based on the work table.

10. The non-transitory computer readable medium of claim 8 further comprising:
    code for marking a group as processed in the work table.

11. The non-transitory computer readable medium of claim 7 further comprising:
    code for determining a set of packaging rules based on the set of groupings.

12. The non-transitory computer readable medium of claim 7 further comprising:
    code for determining a set of shipping rules based on the set of groupings.

13. An inventory system for fulfilling orders, the system comprising:
    a processor; and
    a memory coupled to the processor, the memory configured to store a set of instructions which when executed by the processor become operational with the processor to:
       receive information indicative of a plurality of orders, each order in the plurality of orders specifying one or more order line items;
       group order line items that are identical across orders in the plurality of orders into a set of one or more order line item groups that reduce the likelihood that reservation of one line item in a first order in the plurality of orders delays reservation in the inventory system of an identical line item in a second order in the plurality of orders;
       assign a plurality of reservation processes to concurrently process reservations in the inventory system for a plurality of groups in the set of one or more order line item groups; and
       initiate concurrent processing of the plurality of groups.

14. The system of claim 13 wherein the instructions become operational with the processor to generate a work table in a database for the plurality of reservation processes based on the set of one or more order line item groups, the work table having rows that group order line items based on predetermined criteria.

15. The system of claim 14 wherein the instructions become operational with the processor to determine a group assignment for a reservation process in the plurality of reservation processes based on the work table.

16. The met system of claim 14 wherein the instructions become operational with the processor to mark a group as processed in the work table.

17. The system of claim 13 wherein the instructions become operational with the processor to determine a set of packaging rules based on the set of groupings.

18. The system of claim 13 wherein the instructions become operational with the processor to determine a set of shipping rules based on the set of groupings.

* * * * *

UNITED STATES PATENT AND TRADEMARK OFFICE
CERTIFICATE OF CORRECTION

PATENT NO. : 8,015,079 B2
APPLICATION NO. : 12/165865
DATED : September 6, 2011
INVENTOR(S) : Ramamoorthy et al.

It is certified that error appears in the above-identified patent and that said Letters Patent is hereby corrected as shown below:

In column 3, line 61, delete "one ore more" and insert -- one or more --, therefor.

In column 3, line 61, delete "and or/application" and insert -- and/or application --, therefor.

In column 4, line 6, delete "C#" and insert -- C#$^{TM}$ --, therefor.

In column 6, line 2, delete "or not" and insert -- or no --, therefor.

In column 7, line 16, delete "which ever" and insert -- whichever --, therefor.

In column 8, line 5, delete "5 10." and insert -- 510. --, therefor.

In column 12, line 20, in Claim 16, delete "met system" and insert -- system --, therefor.

Signed and Sealed this
Sixth Day of December, 2011

David J. Kappos
*Director of the United States Patent and Trademark Office*